United States Patent [19]

Kimbell et al.

[11] Patent Number: 5,331,123

[45] Date of Patent: Jul. 19, 1994

[54] SWITCH OPERATIVE RESPONSIVE TO POSITIONING OF A CARD MEMBER

[75] Inventors: Martin J. Kimbell, Wheaton; Mark W. Schwartz, Addison, both of Ill.

[73] Assignee: Motorola Inc., Schaumburg, Ill.

[21] Appl. No.: 894,506

[22] Filed: Jun. 1, 1992

[51] Int. Cl.[5] ............... H01H 35/00; H01H 3/16
[52] U.S. Cl. ............... 200/52 R; 200/61.58 R; 455/89
[58] Field of Search ............... 200/52 R, 46, 61.58 R; 455/73-355, 899; 379/242-337, 357, 362-370

[56] References Cited

U.S. PATENT DOCUMENTS 4,041,259 8/1977 Deming ............... 200/46
5,134,717 7/1992 Rasmussen ............... 455/89

Primary Examiner—J. R. Scott
Attorney, Agent, or Firm—Robert H. Kelly

[57] ABSTRACT

A switch for a card reader assembly forming a portion of a radio transceiver. The switch is operative responsive to positioning of a card member at a support position of the card reader assembly. The switch is operative to move out of a first switch position and into a second switch position responsive to actuation forces exerted upon the switch by the card member. The actuation forces are exerted by the card member to position the switch at the second switch position only when the card member is positioned at the support position. A lever arm of the switch includes a force receiving surface for receiving actuation forces generated by the card member when positioned thereagainst. Application of the actuation forces generates twisting moments to cause pivotal movement of the lever arm about a pivot arm.

20 Claims, 5 Drawing Sheets

ID=5,331,123

SWITCH OPERATIVE RESPONSIVE TO POSITIONING OF A CARD MEMBER

BACKGROUND OF THE INVENTION

The present invention relates generally to switches, and, more particularly, to a switch operative to be positioned in either a first switch position or a second switch position responsive to actuation forces applied thereto by a card member when positioned in abutment with the switch.

Advancements in the field of radio electronics have permitted the introduction and commercialization of an ever-increasing array of radio communication apparatus. Advancements in electronic circuitry design have also permitted increased miniaturization of the electronic circuitry comprising such radio communication apparatus. As a result, an ever-increasing array of radio communication apparatus comprised of ever-smaller electronic circuitry has permitted such radio communication apparatus to be utilized more conveniently in an increased number of applications.

A radio transceiver, such as a radiotelephone utilized in a cellular, communication system, is one example of radio communication apparatus which has been miniaturized to be utilized conveniently in an increased number of applications. Additional efforts to miniaturize further the electronic circuitry of similar such radio transceivers are being made. Such further miniaturization of the radio transceivers will further increase the convenience of utilization of such transceivers, and will permit such transceivers to be utilized in further increased numbers of applications.

Pursuant to such efforts to miniaturize further the electronic circuitry of such radio transceivers (as well as other radio communication apparatus), size minimization of the circuitry is a critical design goal during design of such circuitry. Minimization of the physical dimensions of other structure of such radio transceivers is similarly a critical design goal during design of the radio transceivers.

Concomitant with the miniaturization of the circuitry and other physical structure of such radio transceivers is the introduction of additional innovations, both electronic and mechanical in nature, into the design of such radio transceivers. Such additional innovations provide the radio transceivers with additional features to increase the convenience of use of such transceivers. In a manner similar to the ongoing efforts to minimize the physical dimensions of the electronic circuitry and other structure of the radio tranceivers, efforts are also ongoing to minimize the physical dimensions of the structure of such additional innovations.

With particular reference to a cellular radiotelephone, one type of radio transceiver, an assembly referred to as a card reader assembly, constitutes one such additional innovation included into the design of several constructions of radiotelephones.

A card reader assembly is operative to receive a card member at a support position therein. The card member is substantially similar in dimensions to a conventional credit card, but further includes a memory element disposed thereupon. Identification indicia is stored in the memory element. When the memory element disposed upon the card member is appropriately coupled to the circuitry of the radiotelephone, the information stored within the memory element may be transferred to the circuitry of the radiotelephone.

The identification indicia stored in the memory element includes an identification number to be utilized for billing purposes to bill a phone call made with the radiotelephone to a particular billing account. Because the card member may be removed from a card reader assembly of one radiotelephone, and inserted within the card reader assembly of another radiotelephone, calls made from more than one radiotelephone may be billed to a single billing account.

Radiotelephone constructions having card reader assemblies incorporated therein are advantageous, as a user of more than one radiotelephone may alternately operate the two or more radiotelephones while requiring only a single billing account.

The card members upon which the memory elements are disposed are of a standardized configuration, and the card reader assembly is similarly of a standardized configuration. More particularly, the card member includes electrodes formed upon a face surface thereof. The electrodes are coupled to the memory element disposed upon the card member, and are operative to permit electrical connection between the memory element and the circuitry of the radiotelephone. Such electrodes are positioned at standardized locations upon the card member to permit suitable connection of the electrodes to corresponding contacts of the electronic circuitry of the radiotelephone. The contacts of the circuitry of the radiotelephone are similarly of standardized configurations. In standard configurations, the electrodes formed upon the face surface of the card member are arranged in an array of two rows of three electrodes.

At least one of the radiotelephone contacts is coupled to a radiotelephone power supply which powers the radiotelephone. And, at least one of the radiotelephone contacts is coupled to a ground side of the radiotelephone power supply. Because of the standardized configuration of positioning of the electrodes upon the card member, care must be exercised to ensure that contacts of the electronic circuitry of the radiotelephone coupled to the positive side of the radiotelephone power supply are only powered when the corresponding electrodes of the card member are properly aligned with one another.

Powering of such radiotelephone contacts when the card member is misaligned therewith can result in damage to the memory element disposed upon the card member. (For example, when misaligned such that a radiotelephone electrode coupled to a positive side of the radiotelephone power supply is connected to an electrode coupled to a ground terminal of the memory element disposed upon the card member, the memory element may be damaged or the stored information may be lost.)

Accordingly, the radiotelephone contacts should not be powered until the card member is suitably positioned at a desired support position whereat the electrodes of the card member are suitably aligned with the radiotelephone contacts.

To prevent such powering of the radiotelephone contacts prior to proper positioning of the card member at a support position of the card reader assembly, a switch may be utilized to prevent powering of the radiotelephone electrodes except during times in which the card member is suitably positioned at the support position in the card reader assembly.

While several, existing radiotelephone constructions include such switches, these existing switches are relatively large, difficult to manufacture, and are relatively expensive.

What is needed, accordingly, is a switch of minimal physical dimensions, of low cost, and of convenient construction for use in such an application.

SUMMARY OF THE INVENTION

The present invention, accordingly, advantageously provides a switch which overcomes the limitations of the existing art.

The present invention further advantageously provides a switch of minimal dimensions, of low cost, and of convenient installation to form a portion of a card reader assembly for a radiotelephone.

The present invention includes further advantages and features, the details of which will become more apparent by reading the detailed description of the preferred embodiments hereinbelow.

In accordance with the present invention, therefore, a switch mounted upon a support platform and positioned above an electrical circuit is disclosed. The switch is operative alternately to permit powering of electrical contacts of the electrical circuit or to prevent powering of the electrical contacts. The switch comprises a lever arm having a distal end portion and a proximal end portion. A pivot arm is coupled to the lever arm at a connecting point located along the lever arm and positioned to extend beyond at least one side surface of the lever arm. The pivot arm abuts against the support platform in supportive engagement therewith, and the connecting point defines a fulcrum permitting pivotal movement of the lever arm thereabout. A force receiving surface formed upon the distal end portion of the lever arm receives actuation forces thereat. Actuation forces applied to the force receiving surface generate twisting moments to cause pivotal movement of the lever arm about the fulcrum out of a first switch position whereat powering of the electrical contacts of the electrical circuit is prevented, and into a second switch position whereat powering of the electrical contacts of the electrical circuit is permitted while the actuation forces are applied to the force receiving surface.

BRIEF DESCRIPTION OF THE DRAWINGS

The present invention will be better understood when read in light of the accompanying drawings in which.

DESCRIPTION OF THE PREFERRED EMBODIMENTS

Figure 1:
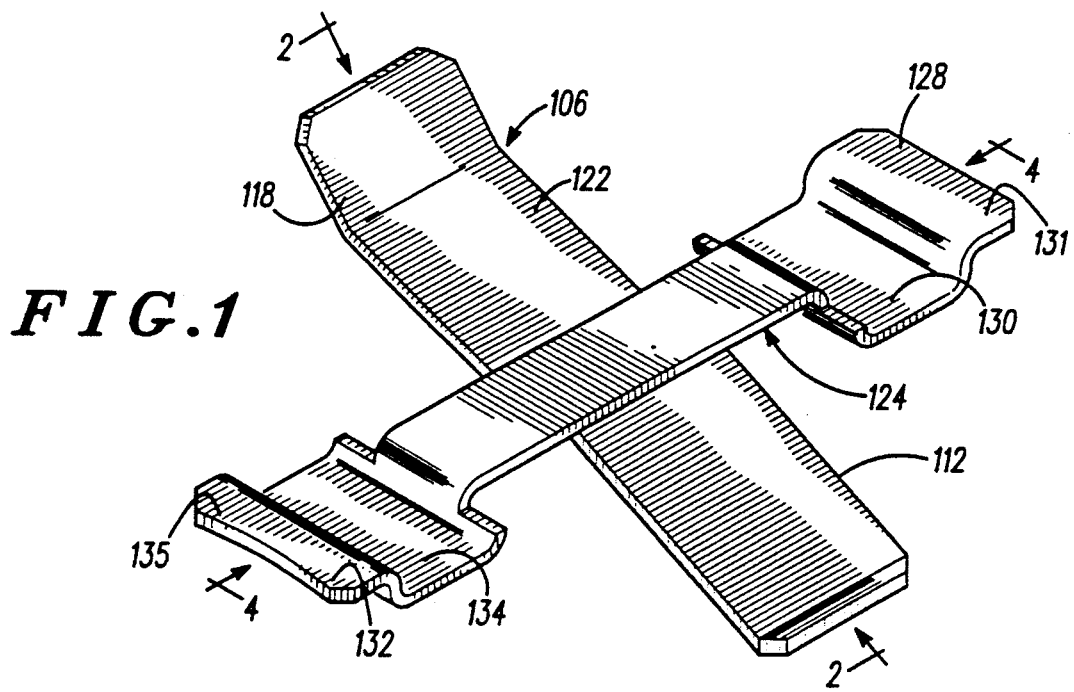
FIG. 1 is an isolational view of the switch of a preferred embodiment of the present invention.

Referring first to the isolated view of FIG. 1, a switch, referred to generally by reference numeral 100, is shown in isolation. Switch 100 is comprised of lever arm 106 having proximal end portion 112 and distal end portion 118. At least proximal end portion 112 is formed of an electrically-conductive material, and in the preferred embodiment of FIG. 1, lever arm 106 is formed of a rigid, bar-like member of a metallic material, such as a beryllium-copper compound.

A face surface of distal end portion 118 defines force receiving surface 122 for receiving actuation forces thereat.

Pivot arm 124 is connected to lever arm 106 along the length of lever arm 106 between proximal end portion 112 and distal end portion 118 and extends at an angle beyond opposing side surfaces of lever arm 106. In the preferred embodiment, pivot arm 124 extends in directions substantially perpendicular to the longitudinal direction of lever arm 106, and is integrally formed with lever arm 106 to be comprised of the same metallic material of which lever arm is comprised. A longitudinal axis of pivot arm 124 defines connection points between pivot arm 124 and lever arm 106 which, in turn, defines a fulcrum, as will be described hereinbelow, about which pivotal motion of lever arm 106 is permitted.

Formed at opposing ends of pivot arm 124 are foot members 128 and 132. Foot members 128 and 132, 130 and 134, respectively include longitudinally-extending depressions forming grooves and end, lipped portions 131 and 132, respectively. Foot members 128 and 132 form retaining members which support switch 100 in position upon a support platform.

Figure 2:
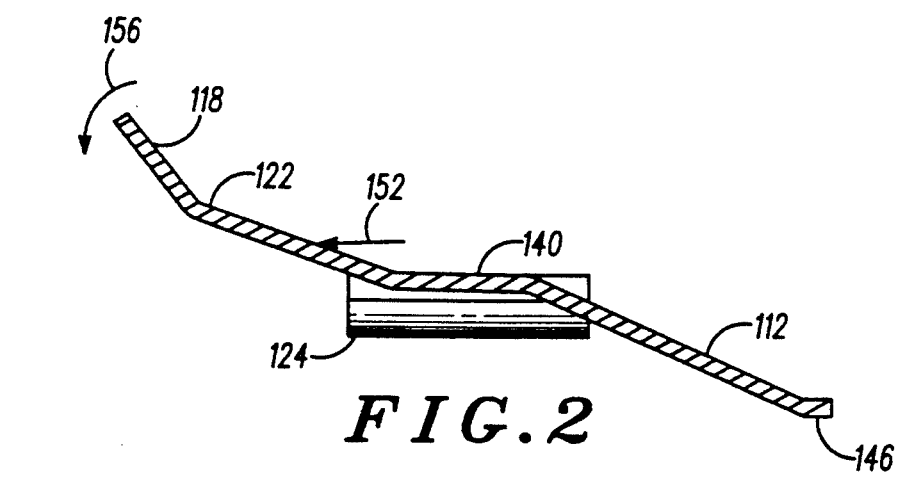
FIG. 2 is a cross-sectional view of the switch of FIG. 1 taken along line II—II of FIG. 1.

Turning next to the cross-sectional view of FIG. 2, a cross-section of lever arm 106 taken along line II—II of FIG. 1 is shown. The sectional view of FIG. 2 illustrates the serpentine-like configuration of the lever arm. In the orientation of FIG. 2, a central portion of lever arm 106 is positioned to extend in a horizontal plane. In such orientation, distal end portion 118 is of a relative elevation greater than the elevation of proximal end portion 112.

Central portion 140 of lever arm 106 corresponds to the connecting points between the lever arm and pivot arm 124. While proximal end portion 112 extends at a downwardly-extending angle relative to the planar direction of central portion 140, a tip portion of proximal end portion 112 is back-angled to have a bottom edge surface 146 which extends in a direction substantially parallel to the planar direction of central portion 140.

Distal end portion 118 of lever arm 106 extends at an upwardly-extending angle relative to central portion 140 and is formed of two tandemly-positioned segments which extend at dissimilar angles. Force receiving surface 122, formed along a first of the segments and at an intersection between the first and second segments of distal end portion 118, accordingly, extends at an angle relative to the horizontal plane defined by central portion 140.

A force applied to force receiving surface 122 in a direction indicated in the figure by arrow 152 (in a direction parallel to the planar, horizontal direction defined by central portion 140), includes a downward component force which generates a twisting moment. The twisting moment generated thereby urges pivotal movement of the lever arm in a direction indicated by arrow 156 about the fulcrum (which is defined by the connecting points between pivot arm 124 and the lever arm).

Figure 3:
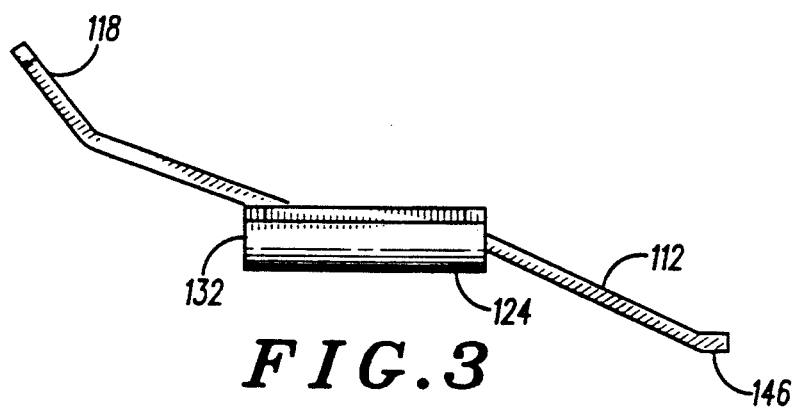
FIG. 3 is an end view of the switch of FIG. 1 taken beyond an end surface thereof.

FIG. 3 is an end view of switch 100 of FIG. 1, taken beyond a side surface thereof. The end view of FIG. 3 again illustrates the serpentine-like configuration of lever arm 106 and illustrates the relative position of proximal and distal end portions 112 and 118, respectively, of the lever arm. While central portion 140, shown in the sectional view of FIG. 2, is hidden from view (by foot member 132 of pivot arm 124) in the end view of FIG. 3, central portion 140 of lever arm 106 can again be seen to extend in a direction substantially parallel to the planar direction defined by bottom edge 146 of the tipped-end portion of proximal end portion 112 of the lever arm.

Figure 4:
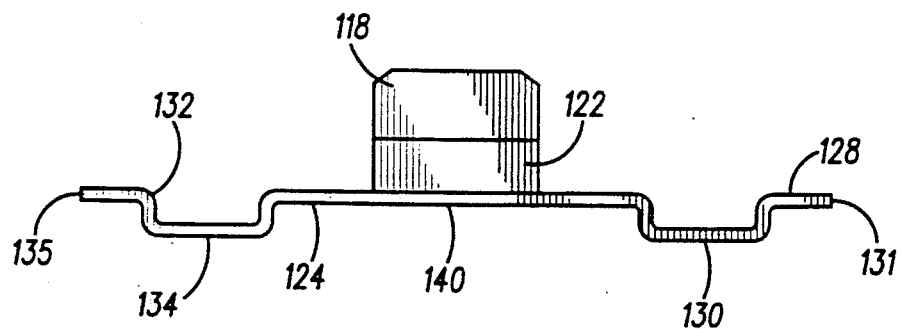
FIG. 4 is a cross-sectional view of the switch of FIG. 1 taken along lines IV—IV of FIG. 1.

FIG. 4 is a sectional view taken along line IV—IV of switch 100 of FIG. 1. In this view, the configuration of pivot arm 124 of switch 100 is shown in greater detail. Foot members 128 and 132 are formed at opposing sides of pivot arm 124. As mentioned with respect to FIG. 1 hereinabove, foot members 128 and 132 each include longitudinally-extending depressions which form grooves, and lipped, edge portions. Pivot arm 124 is aligned with lever arm 106 such that opposing sides of the pivot arm extend equidistantly beyond opposing side surfaces of the lever arm.

Figure 5:
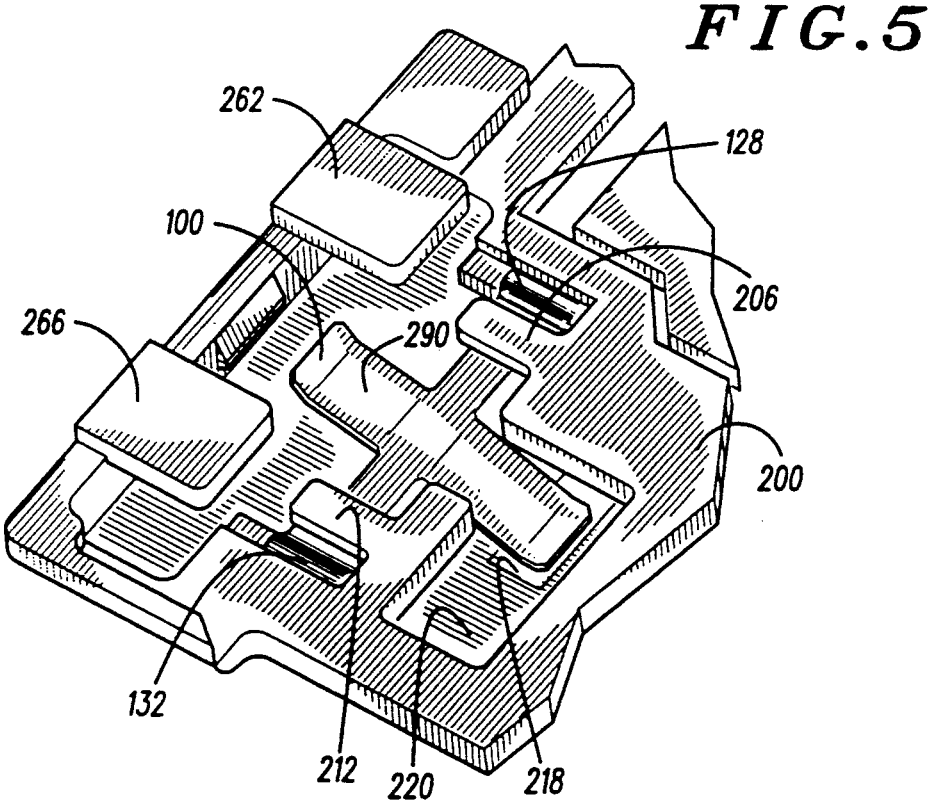
FIG. 5 is an enlarged, cutaway view of a support platform to which the switch of FIG. 1 is affixed to be operable thereat.

FIG. 5 is an enlarged, cutaway view of support platform 200 to which switch 100 of the preceding figures is mounted. Support platform 200 defines a central cavity into which pronged, connecting members 206 and 212 extend.

Connecting members 206 and 212 are configured to engage with foot members 128 and 132 formed at opposing sides of pivot arm 124 of switch 100. And, positioned as illustrated, pronged connecting members 206 and 212 extend along the longitudinally-extending depressions which form grooves along foot members 128 and 132, respectively, to engage in interfitting engagement thereat. Bottom surfaces of the lipped, edge portions of foot members 128 and 132 rest upon the support platform. Because of the interfitting engagement between foot members 128 and 132, and pronged, connecting members 206 and 212, respectively, of support platform 200, switch 100 is retained in an affixed position to be supported by support platform 200.

While the interfitting engagement between foot members 128 and 132 and connecting members 206 and 212 retain switch 100 in an affixed position at support platform 200, application of the actuation forces upon force receiving surface 122 of lever arm 106 causes torsional bending of pivot arm 124. Such torsional bending of pivot arm 124 permits pivotal movement of lever arm 106. Pivotal movement of the lever arm in the direction indicated by arrow 256 causes corresponding rotation of the proximal end portion of the lever arm. When application of the actuation forces is terminated, the twisting moments are no longer generated, and pivot arm 124 returns to a natural position. Such return of the pivot arm to the natural position causes rigid, lever arm 106 to return to the orientation shown in the preceding figures.

When no actuation forces are applied to force receiving surface 122 of the lever arm, bottom edge 146 of the proximal end portion 112 extends beneath the bottom surface of support platform 200.

Support platform 200 to contact an electrical circuit 218 located on a circuit board 220 and coupled to electrical contacts 290 further comprises projections 262 and 266 which form rear, retaining wall members. The lengths of the extensions of projecting members 262 and 266 into the cavity defined by support platform 200 corresponds to the position of the interface between the first and second segments of the distal end portion 118 of the lever arm.

Figure 6:
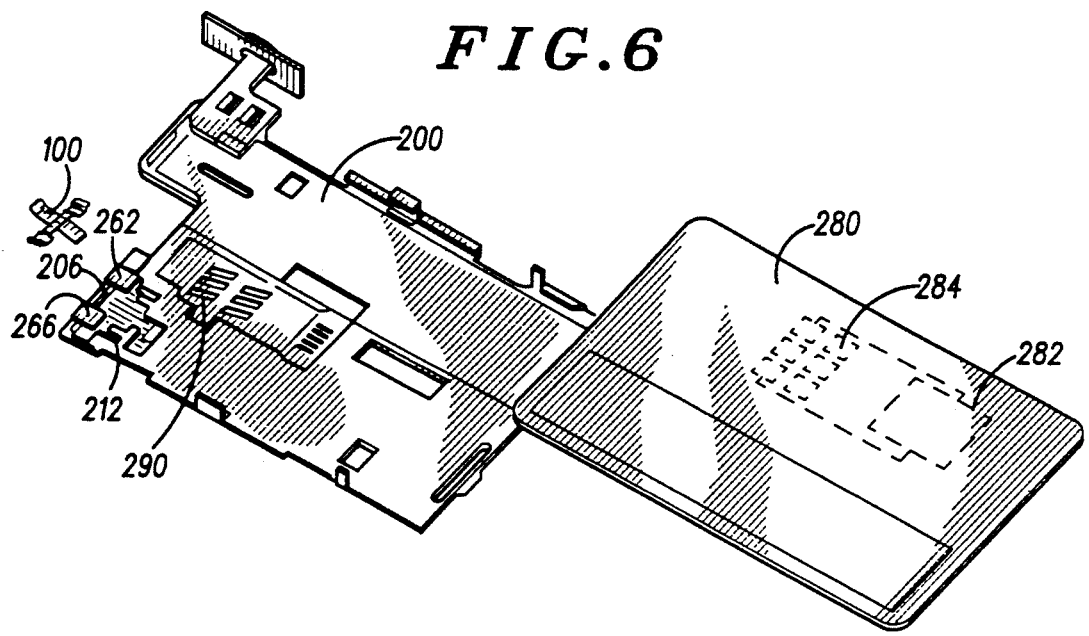
FIG. 6 is an exploded view of the switch of the preceding figures positioned above the support platform of FIG. 5, and, also, a card member which may be received at a support position thereupon.

Turning next to FIG. 6, switch 100 and support platform 200 of the present invention are shown in exploded, perspective form. Switch 100 is positioned above the central cavity defined by support platform 200. Subsequent translation of the switch permits interfitting engagement between the foot members 128 and 132 of pivot arm 124 of switch 100 and the pronged, connecting members 206 and 212 of the support platform to affix the switch in position therewith.

Card member 280 is further shown in the exploded view of FIG. 6. Memory element 282 is disposed upon the card member, and electrodes 284 are formed upon the surface of the card member (the surface of card member 280 upon which electrodes 284 are formed faces support platform 200). Electrodes 284 are connected to the terminals of memory element 282. Electrodes 284 form a standard configuration of an array of two rows and three columns.

Support platform 200 includes a face surface of dimensions permitting sliding translation of card member 280 therealong in a direction indicated by arrow 288 until a front edge surface of card member 280 abuts against edge surfaces of projections 262 and 266. When the front edge surface of the card member 280 abuts against edge surfaces of projections 262 and 266, card member 280 is positioned at a support position. When card member 280 is positioned at the support position, electrodes 284 of card member 280 abut against contacts 290 positioned at the top face surface of support platform 200. Contacts 290 are configured in a standard, two-row, three-column configuration which correspond in a one-to-one relation with the standard configuration of electrodes 284 of card member 280. Contacts 290 are connected to an electrical circuit (not shown in FIG. 6) by way of terminals 294.

As noted hereinabove, contacts 290 should not be powered, i.e., connected to a positive side of a power supply, until the card member 280 is positioned at the support position whereat electrodes 284 of card member 280 are correctly aligned with contacts 290. If one or more of contacts 290 are powered prior to positioning of card member 280 at the support position (or subsequent to removal of card member 280 from the support position), resultant, relative misalignment between electrodes 284 and contacts 290 may result in a powered-contact 290 engaging with an electrode 284 which is connected to a ground terminal of the memory element. Such engagement can result in damage to memory element 282.

Only by preventing powering of contacts 290 except when card member 280 is suitably positioned at a support position whereat electrodes 284 and contacts 290 are properly aligned can damage to the memory element 282 as a result of such undesired electrical connection be precluded.

Switch 100 is positioned such that, when card member 280 is positioned at the support position, the card member exerts an actuation force upon force receiving surface 122 of distal end portion 118 of lever arm 106. Such actuation force generates a twisting moment which causes pivotal movement of the lever arm about pivot arm 124.

As the card member exerts the actuation force upon force receiving surface 122 only when positioned at the support position, no twisting moments are exerted upon the lever arm prior to positioning of the card member at the support position (or subsequent to removal of the card member from the support position).

When the card member is not positioned at the support position, no actuation forces are applied to force receiving surface 122 of lever arm 106, and the orientation of the lever arm positions switch 100 at a first switch position. When the card member is positioned at the support position, actuation forces are applied to force receiving surface 122 to cause pivotal movement of the lever arm about pivot arm 124, thereby to position switch 100 in a second switch position.

By suitable connection of switch 100 to electrical circuit to which contacts 290 are connected, switch 100 may be utilized to prevent powering of contacts 290 when card member 280 is not positioned at the support position upon support platform 200.

Figure 7:
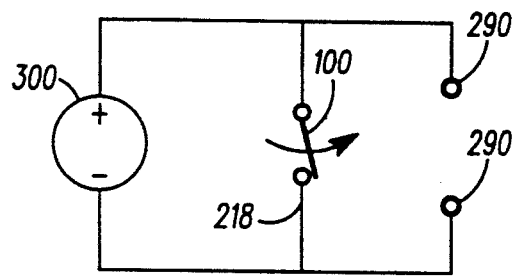
FIG. 7 is a circuit diagram illustrating the relationship between the switch of the preferred embodiments of the present invention and the relationship thereof to a radiotelephone power supply and the radiotelephone contacts which are operative to connect with corresponding electrodes of a card member.

FIG. 7 is a simplified, electrical schematic circuit illustrating an arrangement in which switch 100 may be utilized to prevent powering of contacts 290 except when card member 280 is positioned at a support position upon support platform 200. Here, switch 100 is shown to be a normally-closed switch, positioned in parallel across two electrodes 290. Power supply 300 is representative of a radio telephone power supply.

When positioned in the normally closed position across opposing terminals 290, switch 100 forms a short across electrodes 290 to prevent powering thereof. When, however, switch 100 opens, the switch does not form a short circuit, and electrodes 290 are at an electrical potential corresponding to the potential of power supply 300. Switch 100 of the preceding figures can be configured in a circuit arrangement corresponding to the circuit arrangement of FIG. 8 to prevent powering of contacts 290 except when card member 280 is positioned at the support position upon support platform 200.

Because proximal end portion 112, and, more particularly, bottom edge 146 of the tipped-end portion of proximal end portion 112 is comprised of an electrically-conductive material, positioning of opposing sides of the electrical circuit to which contacts 290 are connected directly beneath switch 100, proximal end portion 112 of lever arm 106 may form the short circuit across opposing sides of the electrical circuit when switch 100 is positioned in the first switch position.

When card member 280 is translated along the surface of support platform 200 to be positioned thereby at the support position whereat actuation forces are exerted upon the force receiving surface 122, lever arm 106 pivots about pivot arm 124 to position the switch at the second switch position out of contact with the opposing sides of the electrical circuit disposed beneath switch 100. In such manner, switch 100 is operative to permit powering of contacts 290 only when card member 280 is positioned at the support position. Other circuit configurations (such as a series connection of switch 100) may, of course, similarly be configured to produce similar results.

Figure 8:
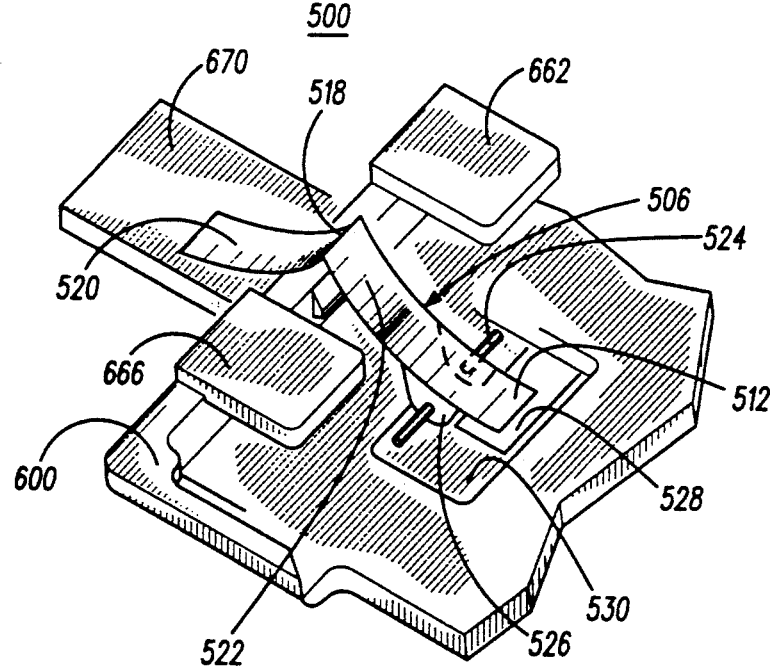
FIG. 8 is an enlarged, cutaway view of a switch of an alternate, preferred embodiment of the present invention.

FIG. 8 is a perspective view of a switch, here referred to generally by reference numeral 500, of an alternate, preferred embodiment of the present invention. Similar to switch 100 shown in the preceding figures, switch 500 includes a lever arm, here lever arm 506. Lever arm 506 includes a proximal end portion 512 and a distal end portion 518. Proximal end 512 is adapted to contact electrical circuit 528 on circuit board 530. Distal end portion 518 here further comprises a back-angled segmental portion 520. A face surface of distal end portion 518 also forms a force receiving surface 522.

Switch 500 further comprises a pivot arm 524 which is affixed to lever arm 506 by way of underhangs 526. Opposing ends of pivot arm 524 may be rotatively supported in support platform 600 by semicircular, bushing-like retainers having slotted openings for receiving ends of the pivot arm 524 (not shown in the figure).

Support platform 600 is further shown to include projections 662 and 666 which form rear retaining wall members. A bottom edge surface of back-angled segmental portion 520 of lever arm 506 additionally rests upon a surface of support platform extension arm 670.

Operation of switch 500 is similar in operation to the operation of switch 100 of the preceding figures. Namely, application of an actuation force upon force receiving surface 522 causes pivotal movement of lever arm 506 about pivot arm 524. Such pivotal movement of the lever arm alters the orientation of proximal end portion 512 of the lever arm. Such pivotal movement of lever arm 506 about pivot arm 524 further causes translation of back-angled segmental portion 520 along support platform extension arm 670.

When the actuation forces are no longer applied to force receiving surface 522, a spring force exerted by the spring formed of the back-angled segmental portion 520 urges pivotal movement of lever arm 506 about pivot arm 524 in a reverse direction.

Accordingly, switch 500 may be mounted upon support platform 600 in a manner analogous to the mounting of switch 100 upon support platform 200 of the preceding figures. Switch 500 may similarly be configured in a circuit configuration corresponding to the circuit shown in FIG. 7 to be operative in a similar manner.

Figure 9:
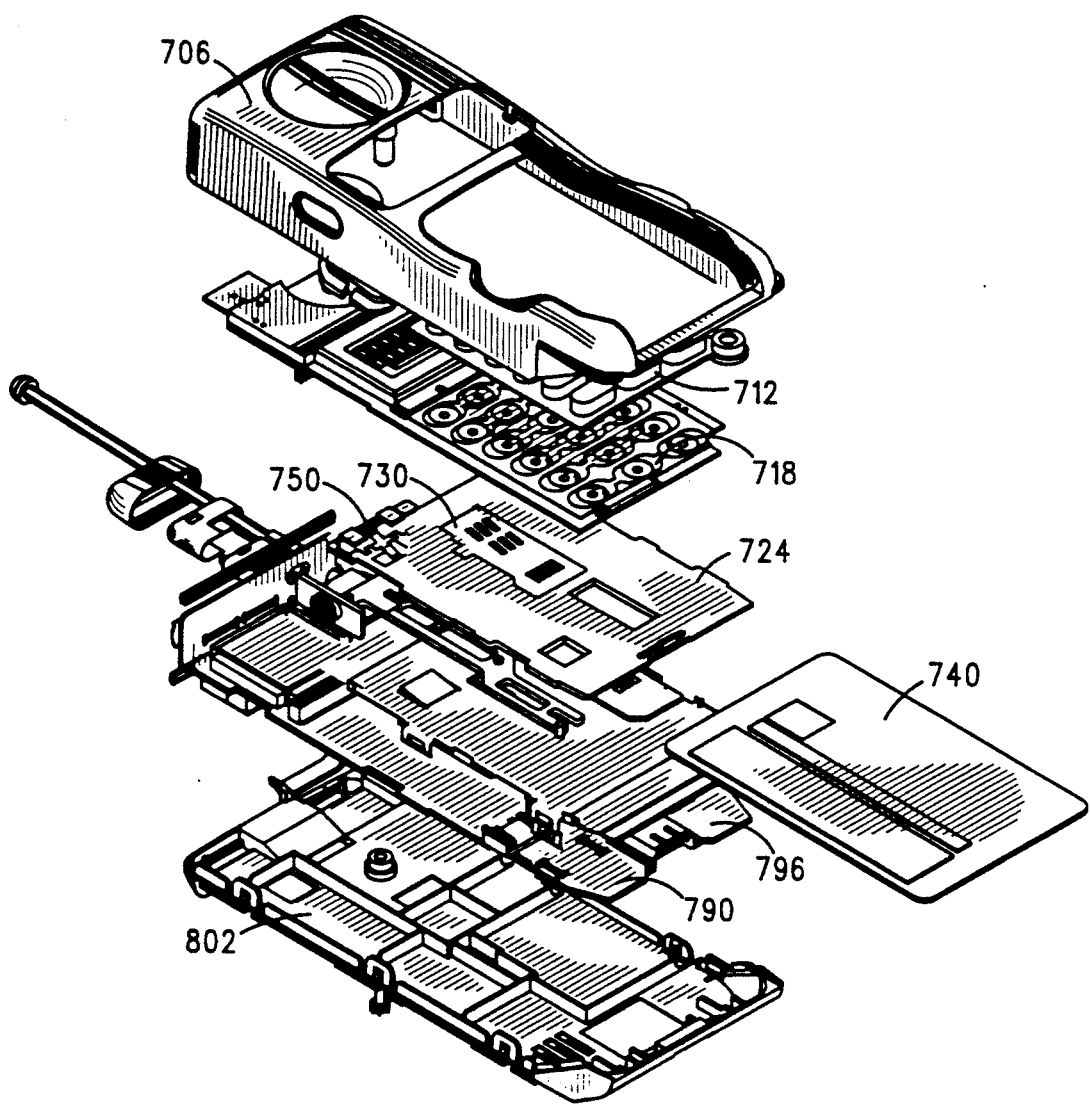
FIG. 9 is an exploded view of a radiotelephone of a preferred embodiment of the present invention which includes the switch of the preceding figures as a portion thereof.

FIG. 9 is an exploded view of a radiotelephone, here referred to generally by reference numeral 700 which incorporates a switch, such as switch 100 or 500, shown in the preceding figures mounted upon a support platform, such as support platform 200 or 600 of the preceding figures to form a portion of the radiotelephone.

Radiotelephone 700 is shown to include front housing 706, keypad 712, keypad circuit board 718, support platform 724 (support platform 724 corresponds to support platform 200 or 600 of the preceding figures). Contacts 730 are formed to be positioned at an elevation corresponding to the elevation of a top face surface of support platform 724.

Card member 740 (which corresponds to card member 280 of FIG. 6 and which includes a memory element and electrodes corresponding to memory element 282 and electrodes 284) is further shown in FIG. 9. Analogous to the description of FIG. 6, the card member, here card member 740, is permitted sliding translation along a top face surface of support platform 724 to position the card member 740 at a support position whereat the electrodes disposed upon the card member abut against contacts 730 to be connected electrically therewith. When the card member 740 is positioned at the support position, actuation forces are exerted upon a distal end portion of switch 750.

Positioned beneath support platform 724 is cover plate 790, and then therebeneath is circuit board 796. Rear housing portion 802 includes appropriate fastening apparatus (and front housing portion 706 includes corresponding fastening apparatus) to permit fastening of rear housing portion 802 with front housing portion 706.

Figure 10:
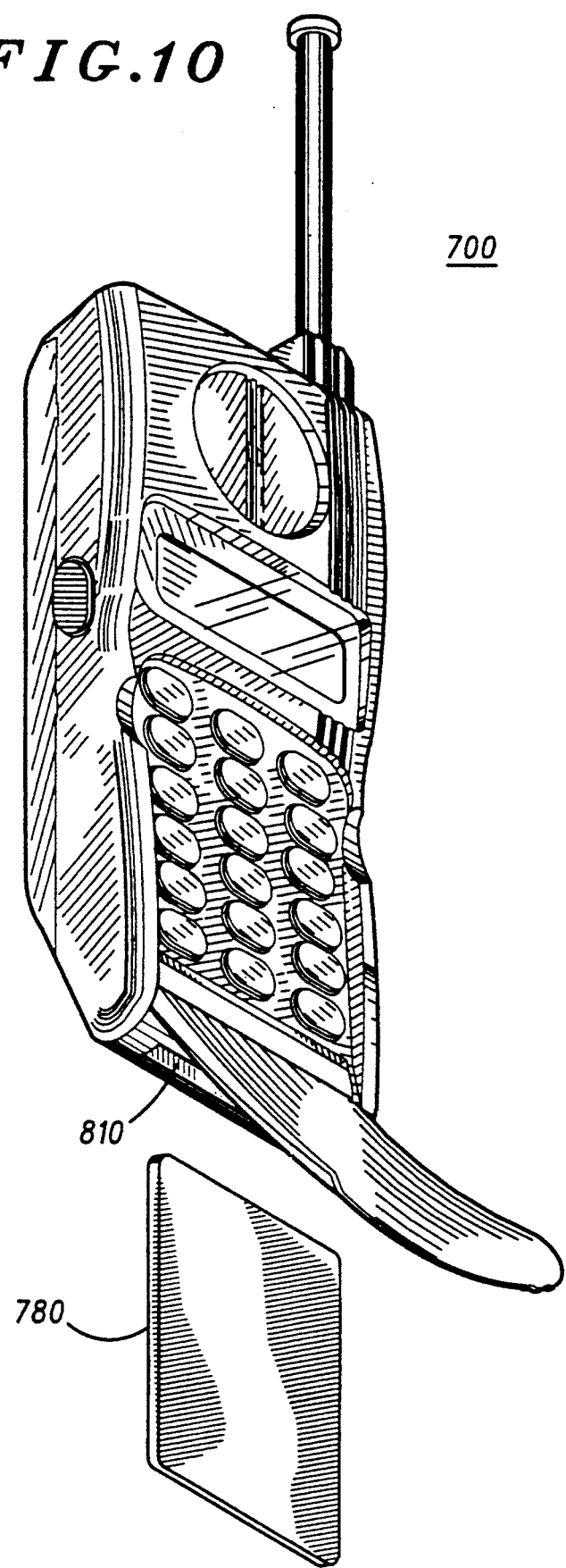
FIG. 10 is a perspective view of the radiotelephone of FIG. 8.

FIG. 10 is a perspective view of radiotelephone 700 shown in the exploded view of FIG. 9. A perspective view of FIG. 9 further illustrates slotted opening 810 permitting insertion of a card member, here card member 780, therewithin. When card member 780 is translated upon a support platform housed within radiotelephone 700 to position the card member 780 at a support position, circuitry within radiotelephone 700 is operative to read the informational indicia contained within the memory element disposed upon card member 780. Because the switch member, such as switch 100 or 500 of the preceding figures, permits contacts which connect with the electrodes formed upon card member 780 to be powered only when card member 780 is positioned at a support position, damage to the memory element disposed upon the card member is prevented.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A switch mounted upon a support platform and positioned above an electrical circuit, the switch being operative alternately to permit powering of electrical contacts of the electrical circuit or to prevent powering of the electrical contacts, said switch comprising:
   a lever arm having a distal end portion and a proximal end portion;
   a pivot arm coupled to the lever arm at a connecting point located along the lever arm and positioned to extend beyond at least one side surface of the lever arm to abut against the support platform in supportive engagement therewith, the connecting point defining a fulcrum permitting pivotal movement of the lever arm thereabout; and
   means forming a force receiving surface upon the distal end portion of the lever arm for receiving actuation forces thereat whereby actuation forces applied to the force receiving surface generate twisting moments to cause pivotal movement of the lever arm about the fulcrum out of a first switch position wherein said proximal end portion of said lever arm is in contact with said electrical circuit and into a second switch position wherein said proximal end portion of said lever arm is out of contact with said electrical circuit to enable powering of the electrical contacts of the electrical circuit.

2. The switch of claim 1 wherein said lever arm comprises a rigid, electrically-conductive bar member.

3. The switch of claim 1 wherein said pivot arm is positioned to extend beyond both a first side surface and a second side surface.

4. The switch of claim 1 wherein said pivot arm further comprises a retaining foot member formed at an end portion thereof for retaining the pivot arm in position in the supportive engagement with the support platform.

5. The switch of claim 1 wherein said twisting moments generated by the actuation forces applied to the force receiving surface formed upon the distal end portion of the lever arm cause torsional deflection of the pivot arm, thereby to cause the pivotal movement of the lever arm about the fulcrum.

6. The switch of claim 1 wherein the proximal end portion of the lever arm is comprised of an electrically-conductive material.

7. The switch of claim 6 wherein the proximal end portion of the lever arm is positioned across opposing sides of the electrical circuit to short the electrical circuit when positioned in the first switch position thereby to prevent powering of the electrical contacts.

8. The switch of claim 7 wherein pivotal movement of the lever arm about the fulcrum into the second switch position positions the proximal end portion of the lever arm out of contact with the opposing sides of the electrical circuit, thereby to permit powering of the electrical contacts.

9. The switch of claim 1 wherein the lever arm and the pivot arm are integrally formed.

10. The switch of claim 9 wherein an edge surface of the bent-angled, distal end portion of the leaf spring comprising the lever arm abuts against a face surface of the support platform.

11. The switch of claim 10 wherein said twisting moments generated by the actuation forces applied to the force receiving surface formed upon the distal end portion of the lever arm causes rotation of the pivot shaft, thereby to cause pivotal movement of the lever arm about the fulcrum.

12. The switch of claim 1 wherein said lever arm comprises a leaf spring having a bent-angled, distal end portion.

13. The switch of claim 1 wherein said pivot arm comprises a pivot shaft rotatably coupled about a longitudinal axis thereof to the support platform.

14. The switch of claim 13 further comprising means for affixing the pivot shaft to the lever arm.

15. An assembly for receiving a portable memory element at a support position such that, when positioned thereat, electrodes of the memory element contact with electrical contacts of an electrical circuit, said assembly comprising:
   a support platform for receiving the portable memory element and for permitting sliding translation of the portable memory element therealong to position the memory element at the support position; and
   a switch operative alternately to permit powering of the electrical contacts of the electrical circuit when the memory element is positioned at the support position or to prevent powering of the electrical contacts when the memory element is positioned beyond the support position, said switch having: a lever arm having a distal end portion and a proximal end portion; a pivot arm coupled to the lever arm at a connecting point located along the lever arm and positioned to extend beyond at least one side surface of the lever arm to abut against the support assembly in supportive engagement therewith, the connecting point defining a fulcrum permitting pivotal movement of the lever arm thereabout; and means forming a force receiving surface upon the distal end portion of the lever arm for receiving actuation forces thereat whereby actuation forces applied to the force receiving surface generate twisting moments to cause pivotal movement of the lever arm about the fulcrum out of a first switch position wherein said proximal end portion of said lever arm is in contact with said electrical circuit and into a second switch position wherein said proximal end portion of said lever arm is out of contact with said electrical circuit to enable powering of the electrical contacts of the electrical circuit.

16. The assembly of claim 15 wherein said support platform further comprises a rear retaining wall extending beyond a face surface of the support platform for abutting against the memory element when the memory element is positioned at the support position, said rear retaining wall for positioning the memory element at the support position.

17. The assembly of claim 16 further comprising a support platform projecting arm projecting beyond the rear retaining wall.

18. The assembly of claim 17 wherein the lever arm of said switch comprises a leaf spring having a bent-angled, distal end portion having an edge surface which abuts against the support platform projecting arm.

19. In a radio transceiver having a support assembly for receiving a portable memory element in a support position and electrical circuitry having electrical contacts permitting electrical connection with corresponding electrodes of the portable memory element when the memory element is positioned at the support position, the combination with the support assembly of a switch operative alternately to permit powering of the electrical contacts of the electrical circuit when the memory element is positioned at the support position or to prevent powering of the electrical contacts when the memory element is positioned beyond the support position, said switch comprising:

a lever arm having a distal end portion and a proximal end portion;

a pivot arm coupled to the lever arm at a connecting point located along the lever arm and positioned to extend beyond at least one side surface of the lever arm to abut against the support assembly in supportive engagement therewith, the connecting point defining a fulcrum permitting pivotal movement of the lever arm thereabout; and means forming a force receiving surface upon the distal end portion of the lever arm for receiving actuation forces thereat whereby actuation forces applied to the force receiving surface generate twisting moments to cause pivotal movement of the lever arm about the fulcrum out of a first switch position wherein said proximal end portion of said lever arm is in contact with said electrical circuitry and into a second switch position wherein said proximal end portion of said lever arm is out of contact with said electrical circuitry to enable powering of the electrical contacts of the electrical circuitry.

20. In a radio transceiver having a support assembly having a support platform for receiving a portable memory element in a support position thereupon and electrical circuitry disposed beneath the support platform having electrical contacts extending to the support platform for permitting electrical connection with corresponding electrodes of the portable memory element when the memory element is positioned at the support position, a method for powering the electrical contacts of the electrical circuit when the memory element is positioned at the support position and for preventing powering of the electrical contacts when the memory element is positioned beyond the support position, said method comprising the step of:

coupling an electrically-conductive lever arm having a distal end portion and a proximal end portion to the support platform such that the distal end portion of the lever arm extends above the support surface and such that the proximal end portion of the lever arm extends beneath the support surface to be positioned in engagement across opposing sides of the electrical circuit to form a short circuit thereby to prevent powering of the electrical contacts, whereby translation of the memory element upon the support platform into position at the support surface causes actuation forces to be exerted upon the distal end portion of the lever arm thereby to generate twisting moments which cause pivotal movement of the lever arm to position the proximal end portion of the lever arm out of the engagement across the opposing sides of the electrical circuit, and thereby to permit powering of the electrical contacts of the electrical circuit.

* * * * *